(12) United States Patent
Saitoh et al.

(10) Patent No.: US 8,746,131 B2
(45) Date of Patent: Jun. 10, 2014

(54) DRIP BAG

(75) Inventors: Mitsunori Saitoh, Osaka (JP); Naoko Yamaguchi, Osaka (JP)

(73) Assignee: Ohki Co., Ltd., Osaka (JP)

( * ) Notice: Subject to any disclaimer, the term of this patent is extended or adjusted under 35 U.S.C. 154(b) by 459 days.

(21) Appl. No.: 12/990,303

(22) PCT Filed: Dec. 24, 2008

(86) PCT No.: PCT/JP2008/073442
§ 371 (c)(1),
(2), (4) Date: Oct. 29, 2010

(87) PCT Pub. No.: WO2009/144852
PCT Pub. Date: Dec. 3, 2009

(65) Prior Publication Data
US 2012/0000369 A1    Jan. 5, 2012

(30) Foreign Application Priority Data

May 26, 2008  (JP) ................. 2008-137337
Jun. 5, 2008   (JP) ................. 2008-148590

(51) Int. Cl.
*A47J 31/44* (2006.01)
(52) U.S. Cl.
USPC .............. 99/279; 99/304; 99/306; 99/321; 99/322; 99/333; 210/474; 210/478; 210/479
(58) Field of Classification Search
USPC ........... 99/321–323, 279, 304, 306; 210/474, 210/478, 479, 506; 248/94, 95
See application file for complete search history.

(56) References Cited

U.S. PATENT DOCUMENTS

| 4,519,911 A * | 5/1985 | Shimizu ................. 210/478 |
| 4,863,601 A * | 9/1989 | Wittekind et al. ......... 210/474 |
| 5,318,786 A * | 6/1994 | Clarkson ................. 426/79 |

(Continued)

FOREIGN PATENT DOCUMENTS

| CN | 1547443 A  | 11/2004 |
| JP | U-6-21526  | 3/1994  |

(Continued)

OTHER PUBLICATIONS

Oct. 12, 2011 Office Action issued in Taiwanese Patent Application No. 098105164 (with translation).

(Continued)

*Primary Examiner* — Dana Ross
*Assistant Examiner* — James Sims, III
(74) *Attorney, Agent, or Firm* — Oliff PLC

(57) ABSTRACT

A drip bag having a bag body and a holder which is formed from a sheet material and is adhered to the bag body. The holder is folded into two parts, a front surface and a rear surface, on a center fold line, and the center fold line overlaps a lateral side of the bag body. V-shaped fold lines bent in V-shapes and extending from the open edge of the drip bag toward the bottom direction thereof are formed in regions on the side of the center fold line of the front surface and the rear surface of the holder. In addition, overhanging parts, which have concave portions for hooking, are formed in a manner that allows them to be pulled open on both the left and right sides of the lower end of each of the front surface and the rear surface of the holder.

12 Claims, 9 Drawing Sheets

(56) References Cited

U.S. PATENT DOCUMENTS

| | | | |
|---|---|---|---|
| 5,605,710 A | * | 2/1997 | Pridonoff et al. ............... 426/86 |
| 5,842,408 A | * | 12/1998 | Hatta ............................. 99/323 |
| 2004/0168578 A1 | * | 9/2004 | Saitoh et al. .................... 99/279 |

FOREIGN PATENT DOCUMENTS

| | | | |
|---|---|---|---|
| JP | A-2002-238767 | | 8/2002 |
| JP | A-2003-135277 | | 5/2003 |
| JP | 2004-242847 A | * | 6/2004 |
| JP | A-2004-181020 | | 7/2004 |
| JP | A-2004-242847 | | 9/2004 |
| JP | B2-3674486 | | 7/2005 |
| JP | A-2007-145346 | | 6/2007 |

OTHER PUBLICATIONS

International Preliminary Report on Patentability issued in Application No. PCT/JP2008/073442; dated Jan. 11, 2011 (with translation).

International Search Report issued in Application No. PCT/JP2008/073442; dated Jan. 20, 2009 (with translation).

Aug. 31, 2012 Office Action issued in Chinese Patent Application No. 200880129587.9 (with translation).

Nov. 7, 2012 Office Action issued in Japanese Application No. 2008-148590 (with English translation).

May 6, 2013 Office Action issued in Chinese Patent Application No. 200880129587.9 (with translation).

\* cited by examiner

DRIP BAG

TECHNICAL FIELD

The present invention relates to a drip bag that can be used to easily obtain an extract, such as a coffee extract, with a drip method, by placing the drip bag on the upper part of a container such as a cup.

BACKGROUND ART

Examples of a drip bag by which one cup of coffee can be easily made by a typical paper drip method include a drip bag in which coffee powder is packed in a bag body formed from a water permeable filterable sheet, and a holder is adhered to the side of the bag body. Although this drip bag may have various configurations, examples of a drip bag suitable for industrial production include a drip bag wherein concave portions for hooking the drip bag on the cup are formed on both the right and left ends of a sheet-shaped paper member, which serves as a holder by folding it into right and left regions at the center fold line, and a bag body and the holder are adhered together so that the center fold line and a lateral side of the bag body overlap each other, whereby the holder opens in a V-shape when in use. In addition, in order to ensure that the holder opens in a V-shape in this manner and the V-shape does not close while hot water is poured into the drip bag, a drip bag has been proposed that is provided with a foldable portion close to the fold line of the holder on the opening side of the bag body (Patent Document 1).

Similarly, a drip bag comprising a water permeable filterable sheet and a holder has been proposed. In case that hot water is poured into this drip bag, the shape of the opening is maintained wide by forming a fold line in the lateral direction intersecting the center fold line of the holder that is folded into right and left regions, as well as forming a cut line extending in the longitudinal direction at both the right and left ends of the fold line extending in the lateral direction, and then folding down the portion upwards from the fold line at the fold line extending in the lateral direction (Patent Document 2).

Patent Document 1: Japanese Patent Application Laid-Open No. 2004-242847
Patent Document 2: Japanese Patent Application Laid-Open No. 2002-238767

DISCLOSURE OF THE INVENTION

Problems to be Solved by the Invention

However, when the above-mentioned drip bag is placing on a cup, the shape of the opening of the holder could only be formed by means of opening the holder in a V-shape using both hands or by means of folding and bending the fold line in the lateral direction using both hands. Accordingly, both methods cannot operate easily with one hand for placing the drip bag on the cup.

Thus, an object of the present invention is to provide a drip bag that can easily form the shape of an opening using one hand when placing the drip bag on a cup.

Means for Solving the Problem

The inventors have found that by means of forming a specific fold line close to the center fold line, it is possible to open a drip bag with one hand easily and also to maintain the shape of the opening while the drip bag is placed to a cup.

Namely, the present invention provides a drip bag comprising:
a bag body which is formed from a water permeable filterable sheet, and in which an extraction material is packed; and
a holder formed from a sheet material and adhered to the bag body, wherein
the holder is folded into two parts, a front surface and a rear surface, at the center fold line so that the center fold line overlaps a lateral side of the bag body,
the drip bag has a V-shaped fold line which is bent in a V-shape and extends from an edge of an opening of the drip bag towards a direction of a bottom thereof in the center fold line side region of each of the front surface and the rear surface of the holder, and
an overhanging part which is formed at a lower end of each of the front surface and the rear surface of the holder so that the overhanging part may be pulled open.

Effect of the Invention

According to the drip bag of the present invention, since a specific fold line is formed at a region on the side of a center fold line of a holder, the bag body can be easily opened and placed on a cup without changing the shape of the opening by means of holding the bag body using one hand so as to support the bag body at both the left and right lateral sides and then applying a force at both the left and right lateral sides of the bag body so as to squeeze the bag.

Therefore, according to the drip bag of the present invention, it is possible to perform a very simple drip operation.

Figure 1:
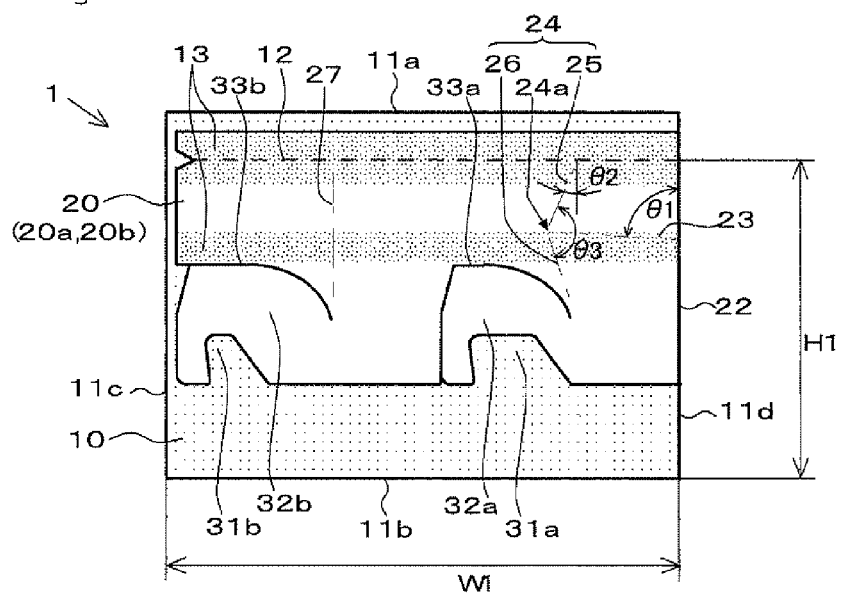
FIG. 1 is a plan view of a drip bag.

DESCRIPTION OF REFERENCE NUMERALS 1, 1B, 1C, 1D, 1E drip bag
10 bag body
11a top side
11b bottom side
11c lateral side 11d lateral side
12 perforation
13 adhesion area
20 holder
20a front surface of a holder
20b rear surface of a holder
22 center fold line
23, 23b first fold line
24, 24b V-shaped fold line
24a elbow of a V-shaped fold line
25, 25b second fold line
26, 26b third fold line
27 fourth fold line
28 fifth fold line
31a, 31b concave portion for hooking the drip bag on the cup
32a, 32b overhanging part
33a, 33b cut line
34 tongue-shaped region
40 original fabric sheet
41 original fabric of a long water permeable filterable sheet
100 cup

DETAILED DESCRIPTION OF THE INVENTION

Hereinafter, the present invention will be described in detail with reference to the drawings. In the drawings, identical symbols represent the same or equivalent members.

Figure 2:
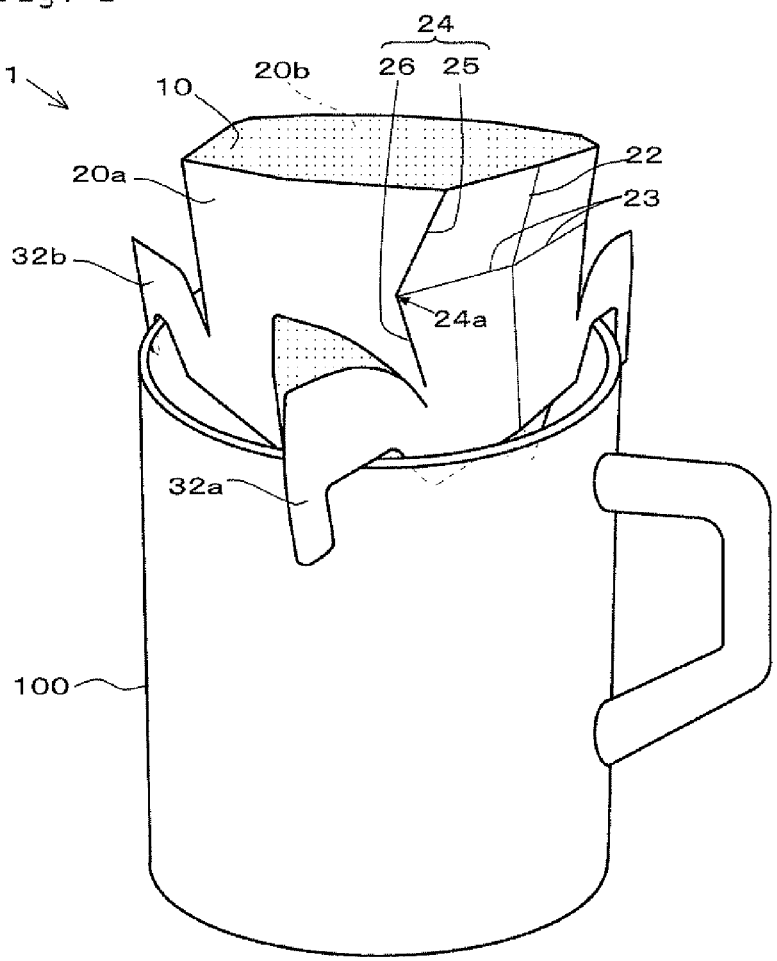
FIG. 2 is a perspective view of the drip bag when it is placed on a cup.
Figure 3:
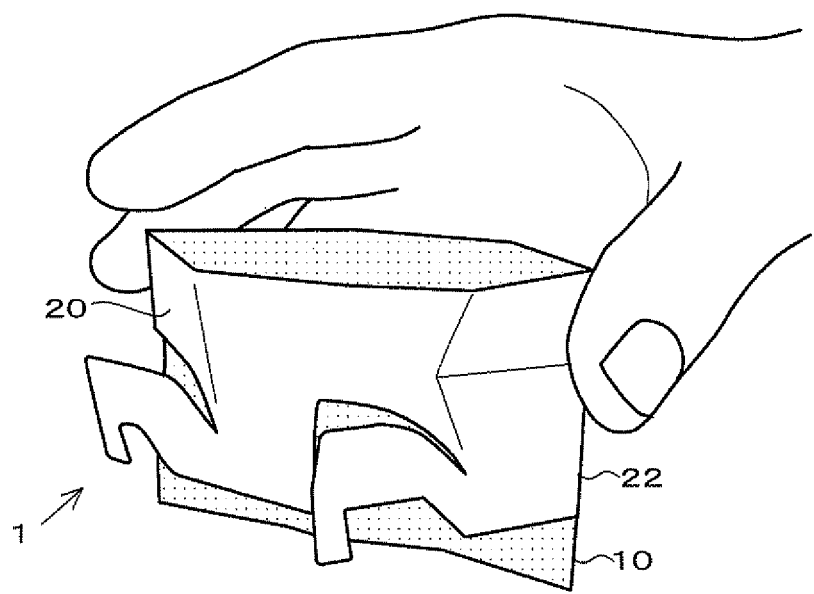
FIG. 3 is a diagram illustrating a method for using the drip bag.
Figure 4:
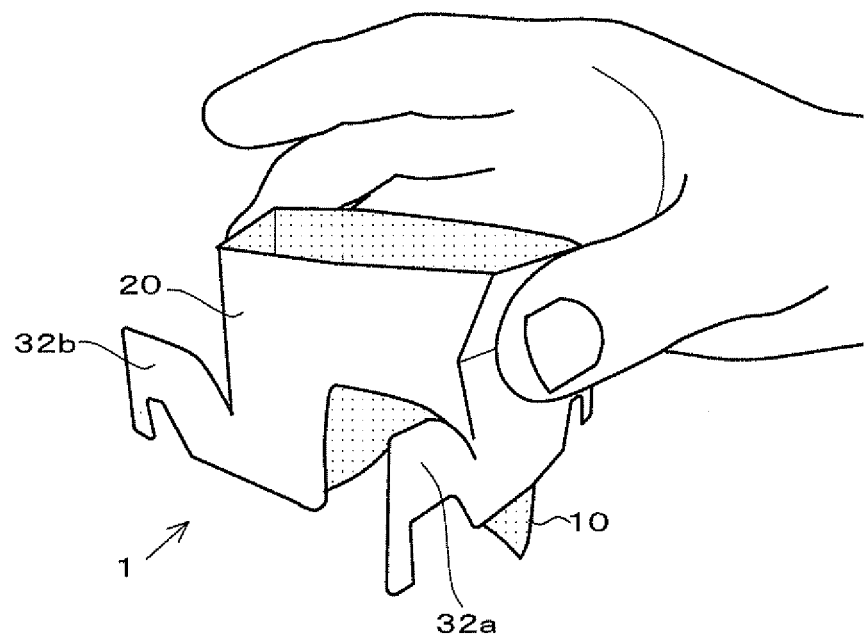
FIG. 4 is a diagram illustrating a method for using the drip bag.
Figure 5:
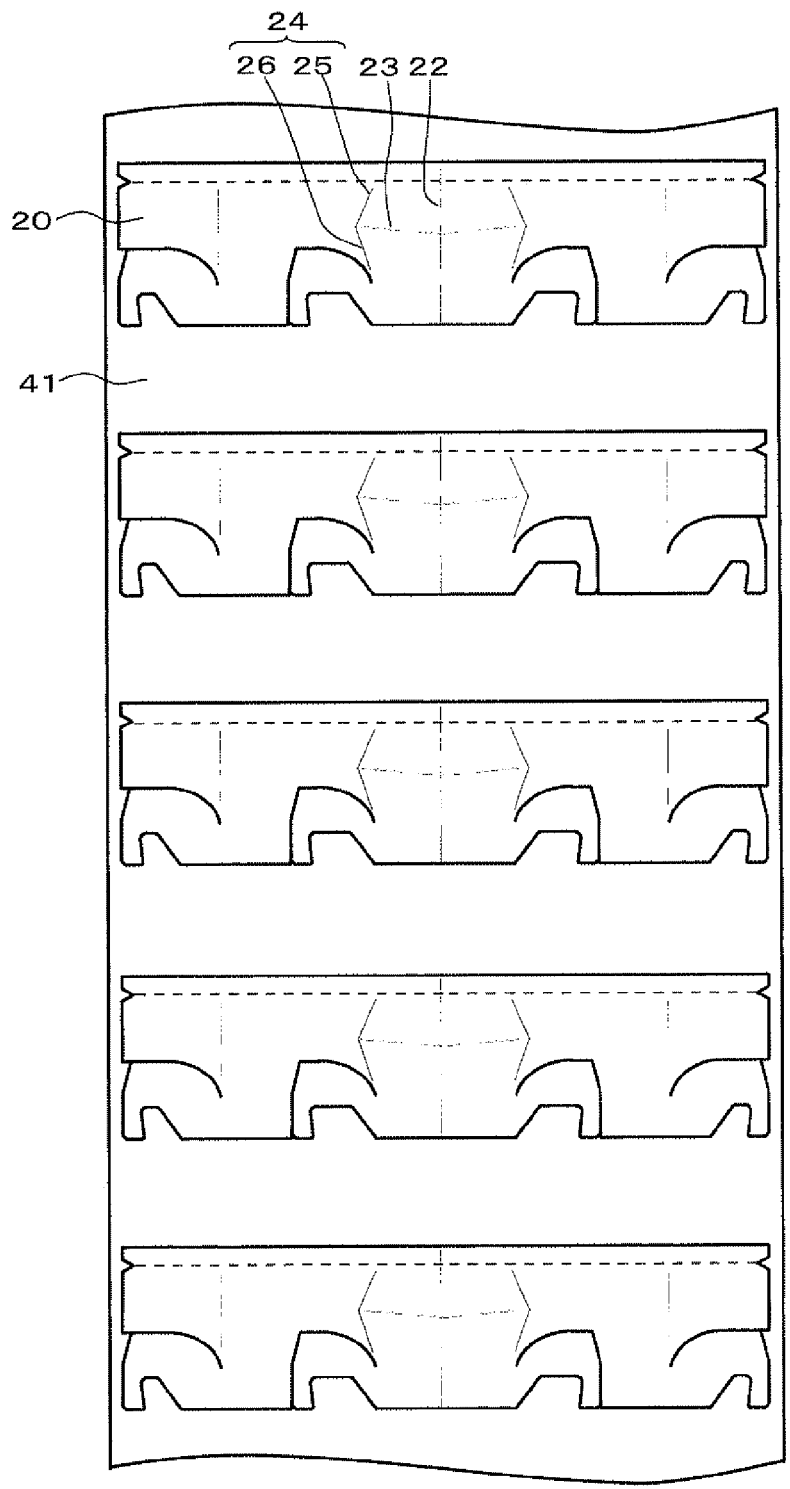
FIG. 5 is a plan view of an original fabric sheet with a holder used to manufacture the drip bag.
Figure 6:
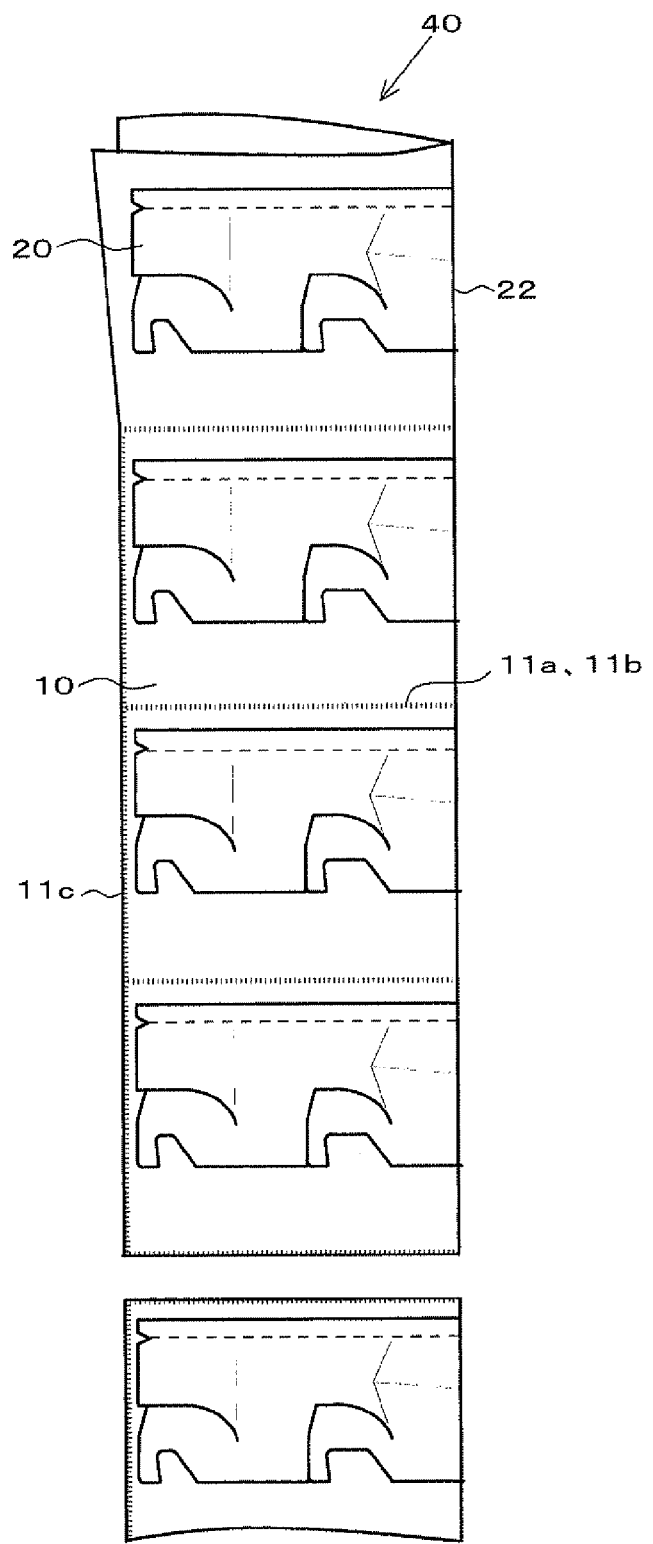
FIG. 6 is a diagram illustrating the method for manufacturing a drip bag that uses the original fabric sheet with the holder.

FIG. 1 is a plan view of a drip bag 1 according to an embodiment of the present invention. FIG. 2 is a perspective view of the drip bag when it is opened and placed on a cup 100. FIG. 3 and FIG. 4 are diagrams illustrating the operation until putting the drip bag 1 onto the cup 100 after opening the drip bag 1. FIG. 5 is a plan view of a holder-included original fabric sheet 40 for use in manufacturing the drip bag 1. FIG. 6 is a diagram illustrating a method for manufacturing the drip bag 1 that uses the holder-included original fabric sheet 40.

This drip bag 1 includes a rectangular shaped bag body 10 and a holder 20 adhered to the bag body 10.

The bag body 10 is formed from a water permeable filterable sheet, and an extraction material is packed therein.

As for the water permeable filterable sheet that forms the bag body 10, there may be used various types of materials that can extract coffee when coffee powder is packed in a bag body formed there from in a predetermined amount and then hot water is poured to the bag body. In general, various types of paper can be used as the extraction sheet. Examples thereof include woven or non-woven fabric made of single or composite fiber of synthetic fiber such as polyester, nylon, polyethylene, polypropylene, and vinylon, semi-synthetic fiber such as rayon, and natural fiber such as Broussonetia and Edgeworthia chrysantha, composite paper made of Manila hemp, wood pulp, polypropylene fiber, or the like, and tea bag raw paper, or the like. These materials can be used in the present invention, preferably, the water permeable filterable sheet material contains biodegradable fibers from the viewpoint of discarding the drip bag after using it. Polylactic acid, polybutylene succinate, or polyethylene succinate may be used as the biodegradable fiber. In addition, in order to provide a suitable steaming effect to the coffee powder during the drip, when manufacturing a water permeable filterable sheet from these textile materials, it is preferable to form a sparse-dense multi-layer structure that has a layer to be directly contacting the coffee powder as a "sparse" layer and a layer not to be directly contacting the coffee powder as a "dense" layer by means of adjusting porosity between the fiber layers, and to increase the content ratio of hydrophobic fibers in the layer to be directly contacting the coffee powder and to decrease the content ratio of hydrophobic fibers in the layer not to be directly contacting the coffee powder (Japanese Patent No. 3674486).

The bag body 10 is sealed at a top side 11a, a bottom side 11b, and a lateral side 11c. The bag body 10 forms a bent portion at the remaining another lateral side 11d at a fold bulge. When using the drip bag 1, the upper edge of the bag body 10 is cut off along a perforation 12 for opening, which is formed along the top side of the holder 20. The line of the perforation 12 functions as an edge at the opening of the drip bag. The net plane surface dimensions of the bag body 10, excluding the portion cut off along the perforation 12, preferably has a width W1 of 70 to 110 mm and a height H1 of 50 to 70 mm for an ordinary cup having an opening diameter of approximately 60 to 105 mm.

On the other hand, the holder 20 is formed by die-cutting a sheet material such as a paperboard or a plastic sheet. This sheet material is also preferably formed of a biodegradable material such as polylactic acid, polybutylene succinate, or polyethylene succinate from the viewpoint of disposability after using the drip bag 1.

The holder 20 is folded into right and left parts, a front surface 20a and a rear surface 20b, at a center fold line 22, forming the front surface and the rear surface of the drip bag 1. In the present invention, the fold line is formed by half-cutting or perforating.

The widths of the front surface 20a and the rear surface 20b of the holder 20 can be regarded to be substantially the same as the width W1 of the bag body 10, although they are slightly narrower than the width W1 of the bag body 10. The holder 20 is adhered to the bag body 10 such that the center fold line 22 of the holder 20 overlaps with the lateral side 11d of the bag body 10 where a bent portion of the bag body 10 is formed.

In regions at the center fold line 22 side of the front surface 20a and the rear surface 20b of the holder 20 compared to the lateral center of the front surface 20a and the rear surface 20b, from the perforation 12 for opening that forms the opening edge of the drip bag 1 towards the direction of the bottom of the drip bag 1, V-shaped fold lines 24 each having an elbow extending in a V-shape are formed. In addition, a first fold line 23 is formed so as to extend from the elbow 24a of the V-shaped fold line 24 into the direction towards the center fold line 22. Preferably, the first fold line 23 of the front surface 20a and that of the rear surface 20b are symmetrically formed centered on the center fold line 22 when the holder 20 is pulled open.

The first fold line 23 is provided as necessary in the present invention, and an angle θ1, which is an angle the first fold line 23 forms with the direction of the center fold line 22, is preferably from 80° to 100°, as shown in FIG. 1. In this embodiment, the angle θ1 is set smaller than 90°.

The V-shaped fold line 24 is composed of a second fold line 25 extending slanted from the elbow 24a into the direction of the opening edge of the drip bag 1, which is a direction that approaches the center fold line 22, and a third fold line 26 extending slanted from the elbow 24a into the direction of the bottom of the drip bag 1. Herein, an angle θ2, which is an angle the second fold line 25 forms with the center fold line 22, is preferably 0° to 30° (FIG. 1). An angle θ3, which is an angle between the second fold line 25 and the third fold line 26, is less than 180° and is preferably 120° to 160°. By means of forming the bent V-shaped fold line 24 that is composed of the second fold line 25 and third fold line 26 in the region on the side of the center fold line 22 of the holder 20 in such a manner, the shape of the opening in FIG. 2, formed by pressing the center fold line 22 towards the center side of the bag body 10, is stabilized thereby making it possible to prevent the shape of the opening from closing while pouring hot water.

In a region opposite to the center fold line 22 of the front surface 20a and the rear surface 20b of the holder 20, a fourth fold line 27 is formed into the direction the center fold line 22 is formed.

Concave portions 31a and 31b are formed on the lower ends at both the left and right sides of the front surface 20a and the rear surface 20b of the holder 20, and cut lines 33a and 33b are formed to allow the concave portions 31a and 31b to be pulled open as overhanging parts 32a and 32b.

At the area where the holder 20 adheres onto the bag body 10, from the viewpoint of improving the overall water permeability of the whole drip bag 1, the holder 20 is preferably partially adhered onto the bag body 10 as long as the holder 20 can stably support the bag body 10. In addition, it is preferable that the overhanging parts 32a and 32b of the holder 20 do not adhere to the bag body 10. This is because the overhanging parts 32a and 32b can be made to protrude from the surface of the bag body 10 so as to facilitate setting up the overhanging parts 32a and 32b to the cup when placing the drip bag 1 on the cup.

The adhesion area is preferably provided such that the bag body 10 opens together with the holder 20 making it difficult for the extracted liquid to accumulate inside the cup 100 when placing the drip bag 1 on the cup 100 as shown in FIG. 2.

Therefore, as shown by the filled fine dots in FIG. 1, it is preferable for the circumference of the opening of the bag body 10 and the belt shaped region immediately above the overhanging parts 32a and 32b to be the adhesion area 13 of the holder 20 and the bag body 10, and for other areas to be non-adhesion regions.

The method for using this drip bag 1 will be described now. First, from the perforation 12 for opening of the holder 20, the side of the upper edge of the drip bag 1 is removed in order to open the bag body 10.

Next, as shown in FIG. 3, the bag body 10 is held by one hand so as to support the bag body 10 with both the left and right lateral sides thereof and then as shown in FIG. 4, the drip bag 1 is lightly pressed from the sides of both the left and right lateral sides of the bag body 10 so as to squeeze the drip bag 1, whereby the bag body 10 opens widely and the overhanging parts 32a and 32b protrudes from the surface of the bag body 10.

Thereafter, as shown in FIG. 2, the overhanging parts 32a and 32b of the drip bag are set up to the upper edge of the cup 100, and hot water is dripped from the opening of the bag body 10 to obtain a coffee extract in the cup 100.

As shown in FIG. 5, the method for manufacturing the drip bag 1 includes: preparing an original fabric sheet 40, which is obtainable by adhering holders 20 at predetermined intervals on an original fabric 41 of a long water permeable filterable sheet, and setting this sheet to a pack-packaging machine. As shown in FIG. 6, the method includes folding the sheet into left and right at the center fold line 22 of the holder 20 and sealing the lateral sides 11c of the bag body 10 to form the holder 20 into a cylindrical shape. The method further includes, along with this, sequentially sealing the top side 11a and the bottom side 11b of the bag body 10 while charging the content into the bag body 10 to manufacture individual drip bags continuously, and separating them to obtain individual drip bags 1. Alternatively, while sealing the top side 11a and the bottom side lib of the bag body 10, fusion cutting may simultaneously be conducted to continuously manufacture drip bags 1 that are separated from each other.

The drip bag of the present invention may be embodied in various different modes.

Figure 7:
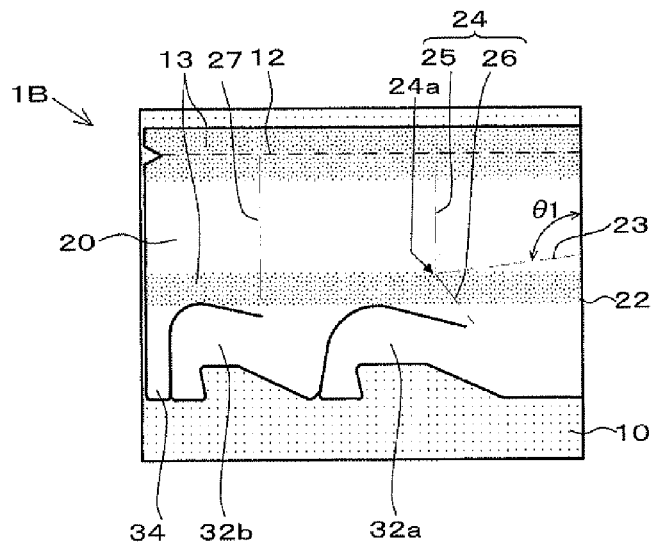
FIG. 7 is a plan view of a drip bag.
Figure 8:
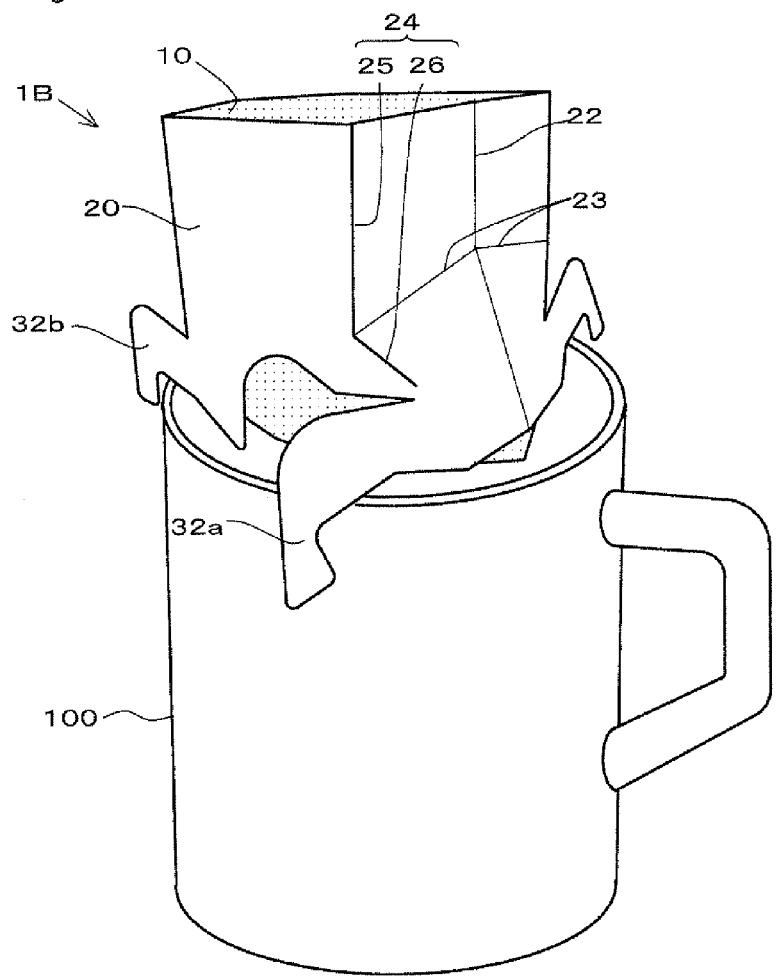
FIG. 8 is a perspective view of the side of a center fold line of the drip bag when it is placed on a cup.
Figure 9:
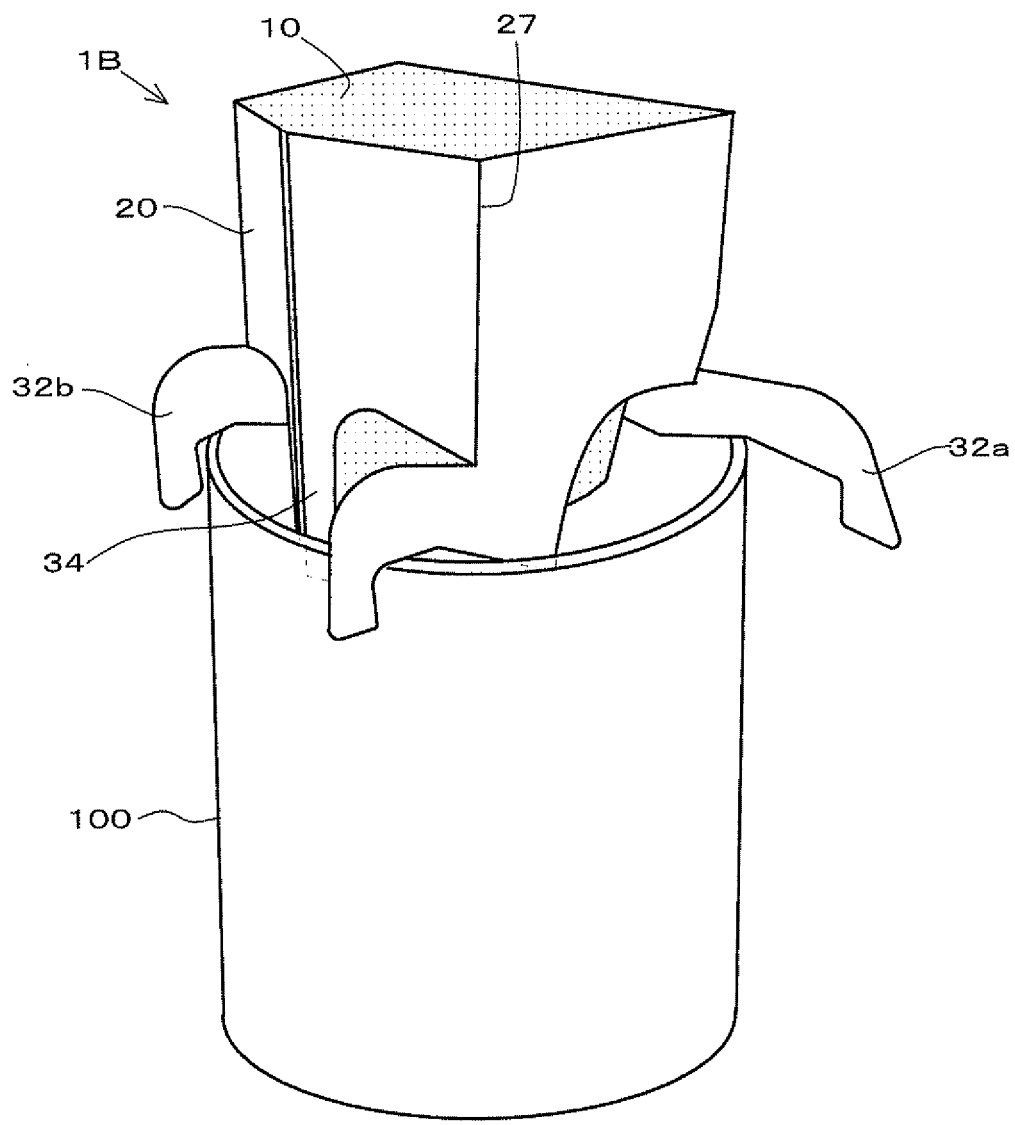
FIG. 9 is a perspective view of the side opposite to the center fold line of the drip bag when it is placed on a cup.

For example, in the drip bag 1B shown in FIG. 7, FIG. 8, and FIG. 9, the second fold line 25 that forms the V-shaped fold line 24 extends perpendicular to the perforation 12 for opening from the elbow 24a of the V-shaped fold line (namely, parallel to the center fold line 22) and the angle $\theta 1$ between the first fold line 23 and the center fold line 22 is made larger than 90°.

Furthermore, this drip bag 1B has a tongue-shaped region 34, which is not pulled open to function as the supporting parts 32b, on the side of the bottom of the side edge of the holder 20 on the side opposite to the center fold line 22.

By means of this drip bag 1B also having the V-shaped fold line 24, the drip bag 1B can be quickly opened wide and the shape of the opening of the bag can be stabilized by only holding the bag body 10 from both the left and right sides using one hand and then lightly pushing the drip bag 1B so as to squeeze the drip bag 1B after the bag body 10 is opened at the perforation 12 for opening. In particular, because the angle $\theta 1$ between the first fold line 23 and the center fold line 22 is larger than 90°, the stability of the shape of the opening improves. Therefore, as shown in FIG. 8, the drip bag 1B can be placed on the upper edge of the cup 100 with an even simpler action.

Further, because this drip bag 1B has the tongue-shaped region 34 on the side of the bottom of the side edge of the holder on the side opposite to the center fold line 22, the bag body 10 can be pressed at the tongue-shaped region 34 so as to prevent it from protruding from the outer periphery of the holder 20 when placed on the cup 100 as shown in FIG. 9. Therefore, it is possible to place the bag on the cup 100 easily.

Figure 10:
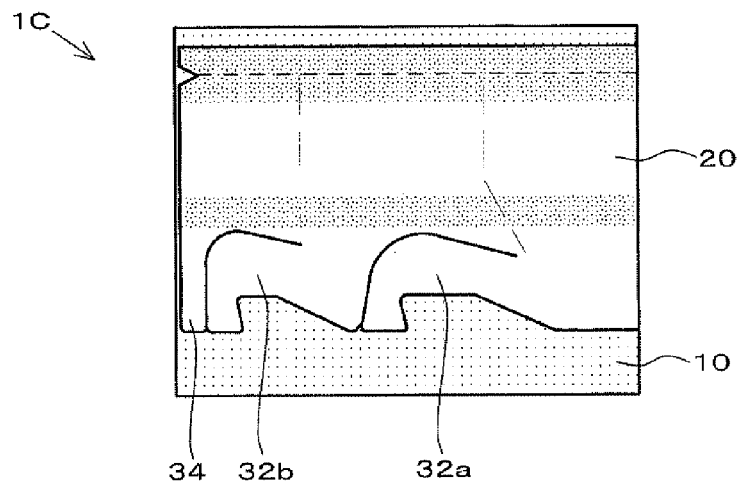
FIG. 10 is a plan view of a drip bag.
Figure 11:
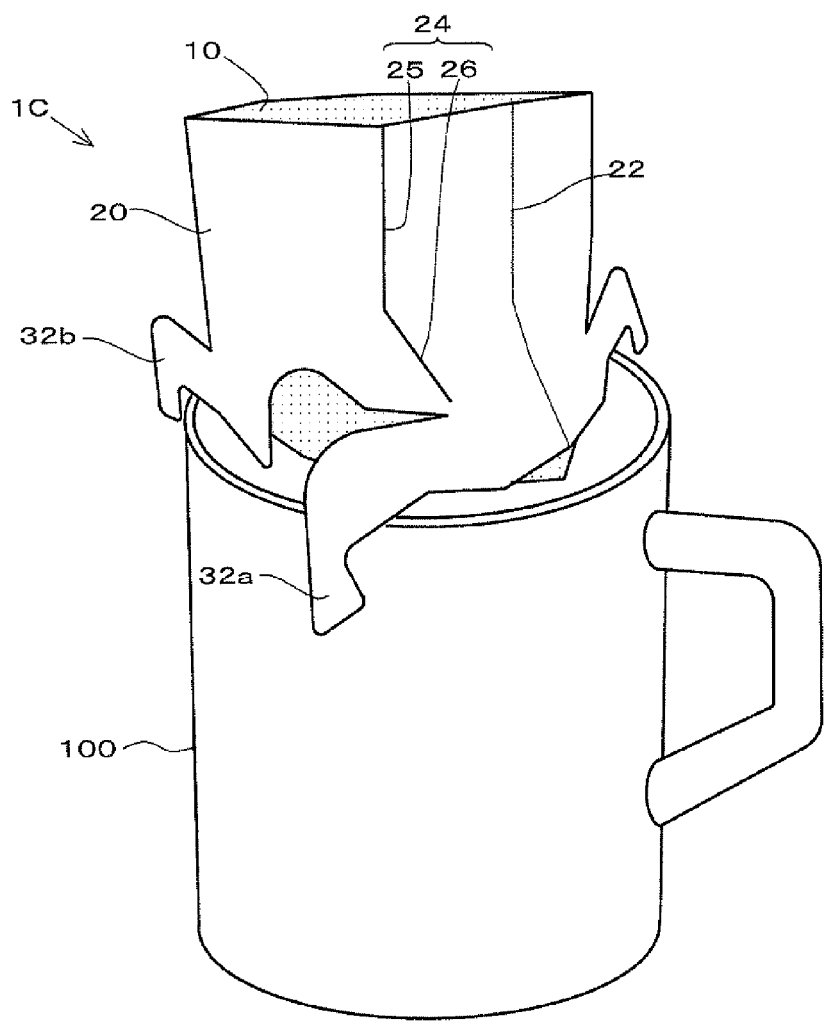
FIG. 11 is a perspective view of the drip bag when it is placed on a cup.

In addition, as to the drip bag of the present invention, the first fold line 23 can be omitted from the above-mentioned drip bag 1B as in the drip bag 1C shown in FIG. 10 and FIG. 11. This drip bag 1C can also be easily opened using one hand and placed on the upper edge of the cup 100 as shown in FIG. 11.

Figure 12:
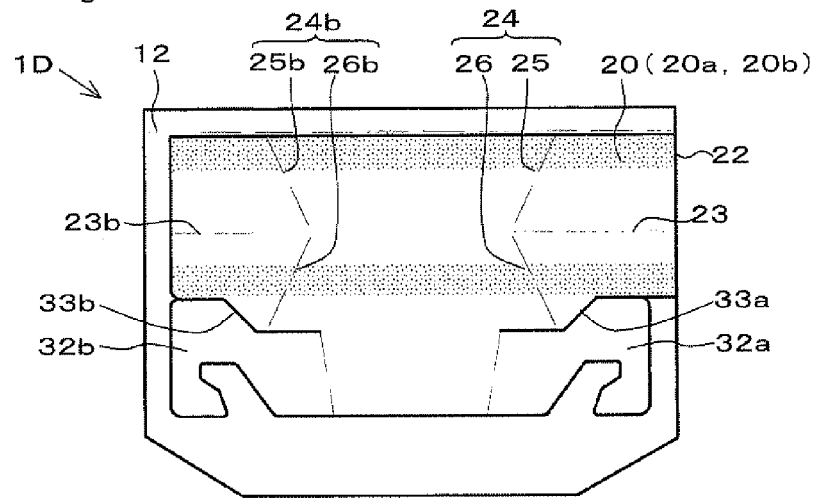
FIG. 12 is a plan view of a drip bag.
Figure 13:
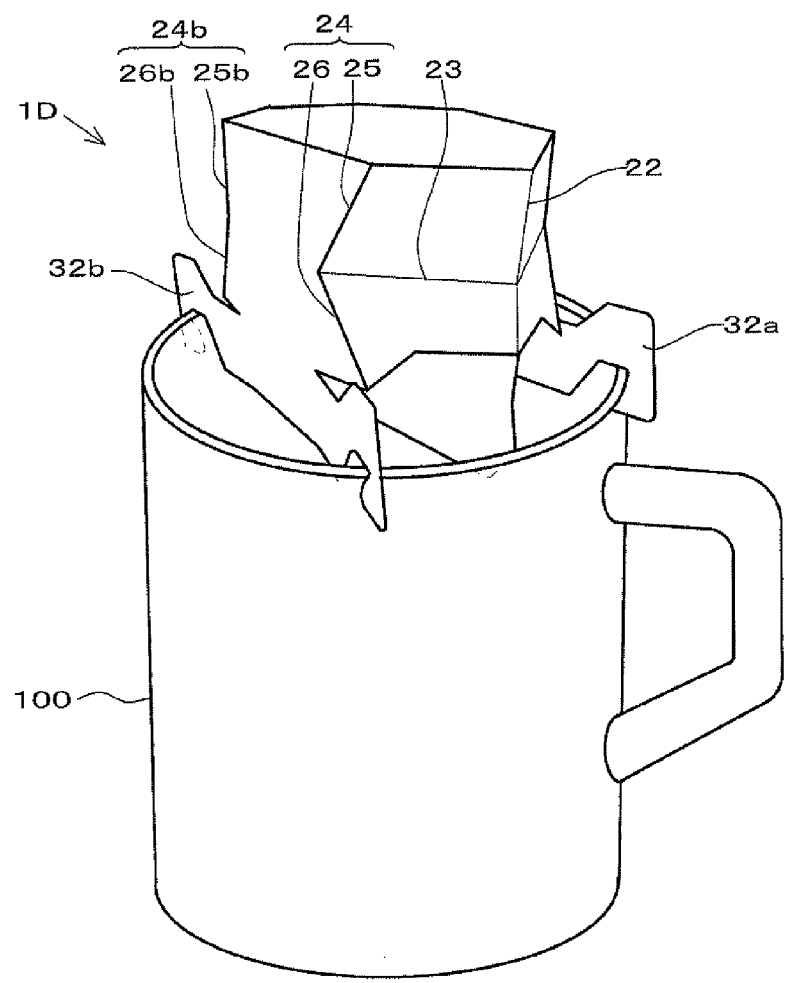
FIG. 13 is a perspective view of the drip bag when it is placed on a cup.

As shown in the drip bag 1D shown in FIG. 12 and FIG. 13, the V-shaped fold line 24b, composed of the second fold line 25b and the third fold line 26b, and the first fold line 23b may be formed bilaterally symmetrical to the side edge of the center fold line 22 at the region opposite to the center fold line 22 also on the front surface 20a and the rear surface 20b of the holder 20.

Cut lines 33a and 33b may also be formed such that the pulling directions of the overhanging parts 32a and 32b become bilaterally symmetrical at both the front surface 20a and the rear surface 20b of the holder 20.

Instead of forming on the holder 20, the perforation 12 for opening of the bag body 10 may also be formed on the upper edge of the bag body 10 where the holder 20 is not adhered onto the bag body 10.

Figure 14:
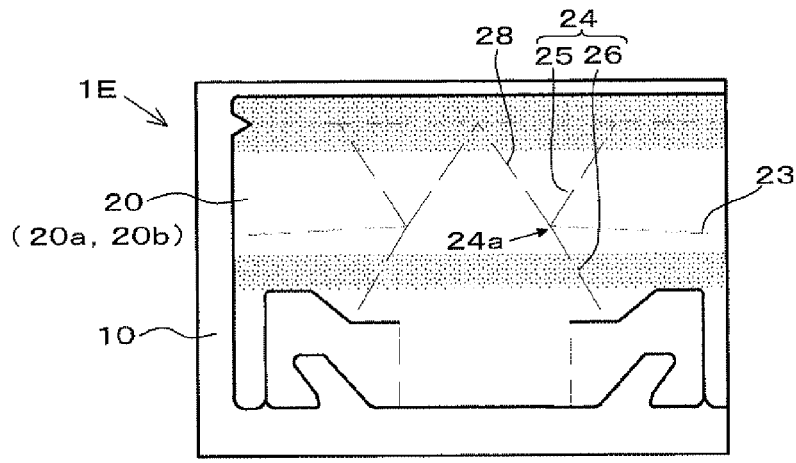
FIG. 14 is a plan view of a drip bag.
Figure 15:
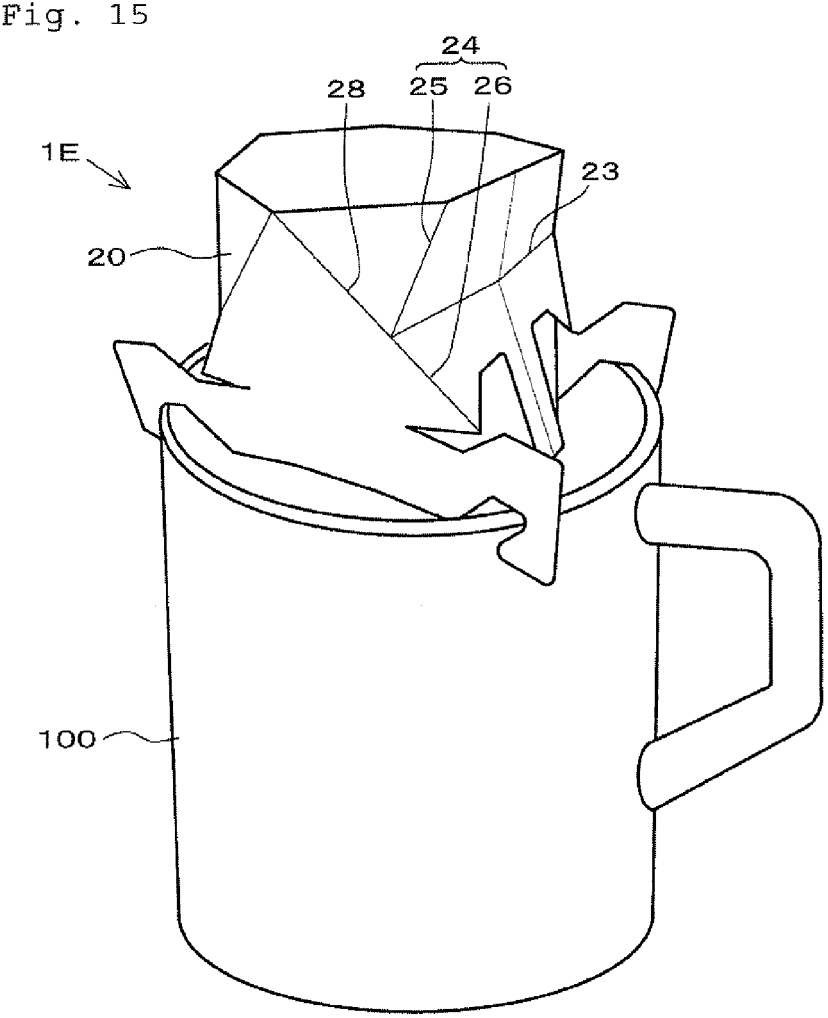
FIG. 15 is a perspective view of the drip bag when it is placed on a cup.

Moreover, as shown in the drip bag 1E shown in FIG. 14 and FIG. 15, a fifth fold line 28 may also be formed extending from the elbow 24a of the V-shaped fold line towards the center upper edge of the front surface 20a and the rear surface 20b of the holder 20. Therefore, it is possible to make the shape of the opening of the bag body 10 close to a circular shape.

Although a drip bag in which coffee powder is charged into a bag body was described above, the extraction material to be charged into the bag body of the drip bag of the present invention is not limited to coffee powder but may be black tea leaves, green tea leaves, Chinese herbal medicine, or the like.

INDUSTRIAL APPLICABILITY

The drip bag of the present invention is useful as an extraction device that subjects various types of extraction materials, such as coffee powder, to drip methods, for easily obtaining extracts of those extraction materials.

The invention claimed is:

1. A drip bag comprising:
a bag body comprised of a water permeable filterable sheet, the bag body being configured to hold an extraction material in the bag body;
a holder comprised of a sheet material and adhered to the bag body, wherein
the holder includes (i) a front surface, (ii) a rear surface, and (iii) a center fold line that overlaps a lateral side of the bag body and that separates the front surface from the rear surface,
the holder includes V-shaped fold lines, each of the V-shaped fold lines being disposed on the front surface and the rear surface of the holder such that when the drip bag is in an open or a closed configuration, the V-shape fold lines do not intersect the center fold line,
when the drip bag is in the open configuration and defines a volume, each of the V-shaped fold lines is bent in a V-shape and extends from an edge of an opening of the drip bag towards a direction of a bottom thereof, and
an overhanging part is disposed at lower ends of the front surface and the rear surface of the holder.

2. The drip bag according to claim 1, wherein at each of the front surface and the rear surface of the holder, the holder has a first fold line extending from an elbow of the V-shaped fold line into a direction towards the center fold line.

3. The drip bag according to claim 2, wherein the lateral side of the bag body constitutes a bent portion of a water permeable filterable sheet.

4. The drip bag according to claim 3, wherein the extraction material is coffee powder or tea leaves.

5. The drip bag according to claim 2, wherein the extraction material is coffee powder or tea leaves.

6. The drip bag according to claim 1, wherein the lateral side of the bag body constitutes a bent portion of a water permeable filterable sheet.

7. The drip bag according to claim 6, wherein the extraction material is coffee powder or tea leaves.

8. The drip bag according to claim 1, wherein the extraction material is coffee powder or tea leaves.

9. The drip bag according to claim 1, wherein each of the V-shaped fold lines comprises (i) one fold line extending slanted from an elbow of the V-shaped fold line into the direction of the opening edge of the drip bag, which is a direction that approaches the center fold line, or extending perpendicular to the opening edge of the drip bag, and (ii) an other fold line extending slanted from the elbow of the V-shaped fold line into the direction of the bottom of the drip bag.

10. The drip bag according to claim 1, wherein the overhanging part supports the holder.

11. The drip bag according to claim 1, wherein the holder includes four overhanging parts.

12. The drip bag according to claim 1, wherein the drip bag is configured to be opened and placed on a cup using one hand.

* * * * *